(12) United States Patent
Bergmann et al.

(10) Patent No.: US 7,799,227 B2
(45) Date of Patent: Sep. 21, 2010

(54) METHOD FOR HYGIENIC OPERATION OF AN ION EXCHANGER

(75) Inventors: Ralph Bergmann, Weinheim (DE); Jürgen Johann, Mondsee (AT)

(73) Assignee: WP Engineering Limited, Valletta (MT)

( * ) Notice: Subject to any disclaimer, the term of this patent is extended or adjusted under 35 U.S.C. 154(b) by 605 days.

(21) Appl. No.: 11/665,596

(22) PCT Filed: Oct. 14, 2005

(86) PCT No.: PCT/EP2005/011060

§ 371 (c)(1), (2), (4) Date: May 9, 2007

(87) PCT Pub. No.: WO2006/042702

PCT Pub. Date: Apr. 27, 2006

(65) Prior Publication Data

US 2008/0110834 A1 May 15, 2008

(30) Foreign Application Priority Data

Oct. 20, 2004 (DE) .................. 10 2004 051 017

(51) Int. Cl.
*B01D 15/00* (2006.01)

(52) U.S. Cl. .............. 210/670; 210/673; 210/687; 210/754

(58) Field of Classification Search ........... 210/670, 210/673, 687, 754
See application file for complete search history.

(56) References Cited

U.S. PATENT DOCUMENTS

| 3,585,147 A * | 6/1971 | Gordon .............. 252/187.21 |
| 3,787,339 A * | 1/1974 | Hodgdon et al. .............. 521/26 |
| 4,113,612 A | 9/1978 | Sekoulov et al. |
| 2003/0006144 A1 * | 1/2003 | Tremblay et al. ........... 205/618 |

FOREIGN PATENT DOCUMENTS

| DE | 12 35 267 B | 3/1967 |
| WO | WO 2005/102920 A | 11/2005 |

\* cited by examiner

*Primary Examiner*—Chester T Barry
(74) *Attorney, Agent, or Firm*—Collard & Roe, P.C.

(57) ABSTRACT

The invention relates to a method and corresponding plant for the hygienic operation of an ion exchanger, in particular, in water treatment, whereby the ion exchanger is regenerated by a regenerating agent solution during a regeneration phase. According to the invention, a simultaneous disinfection effect may be achieved, whereby chlorine dioxide is generated in situ in the regenerating agent solution and run through the ion exchanger.

8 Claims, 1 Drawing Sheet

METHOD FOR HYGIENIC OPERATION OF AN ION EXCHANGER

Figure 1:
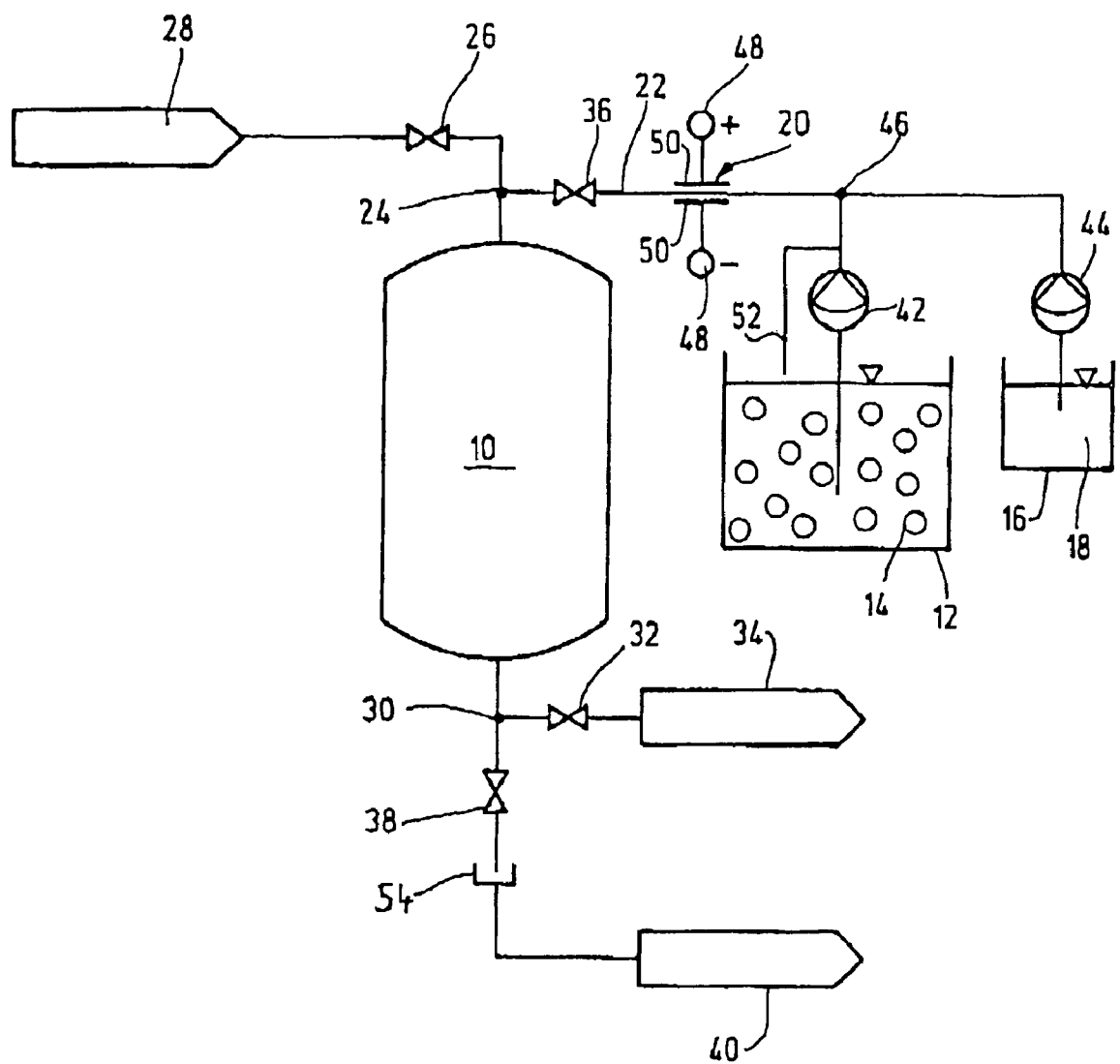

The invention relates to a method for hygienic operation of an ion exchanger, particularly in water treatment, in which the ion exchanger is regenerated by means of a regeneration agent solution during a regeneration phase. The invention furthermore relates to a system for carrying out the method.

Ion exchangers are used, in large numbers, as cation exchangers in residences and office buildings, for softening drinking water. However, since the exchange capacity is finite, regeneration must take place at regular intervals. For this purpose, sodium chloride or potassium chloride, in some cases also magnesium chloride, are used. A problem of ion exchangers is their tendency to become filled with germs, whereby the system is open towards both sides, namely towards the untreated water input side and towards the regeneration agent input. The cause of the germ accumulation is bacteria that are brought to the ion exchanger on the input side, by way of the drinking water, colonize it, and in turn are given off to the treated water. In addition, the introduction of bacteria takes place by way of the regeneration agent and its supply. In practice, electrolytic chlorine production is generally used for disinfection. However, chlorine has serious disadvantages as a disinfection agent. The disinfecting effect is dependent on the pH, and significantly decreases in the alkaline range above pH=8. Furthermore, chlorine can form odor or flavor substances with water ingredients or organic substances given off by the ion exchanger, which have a negative effect on the quality of the softened water. It is also disadvantageous that chlorine is consumed by a biofilm that might be formed in the system, and is only insufficiently capable of reducing existing biofilms.

Proceeding from this, the invention is based on the task of avoiding the disadvantages that have occurred in the state of the art, and achieving a disinfecting effect in the operation of ion exchangers, using a system that is easy to handle.

To accomplish this task, the combination of characteristics indicated in claim 1 and 12, respectively, is proposed. Advantageous embodiments and further developments of the invention are evident from the dependent claims.

The invention proceeds from the thought of making chlorine dioxide available as a biocidal substance, by way of the regeneration agent. Accordingly, it is proposed, in terms of the method, that chlorine dioxide is generated in situ in the regeneration agent solution, and passed through the ion exchanger. As a result, a separate method step is not necessary, and instead, the disinfection can be combined with the regeneration that is necessary in any case. At the same time, a possible introduction of germs by way of the regeneration agent is counteracted with this. The disinfecting effect of chlorine dioxide is independent of pH, to the greatest possible extent. Chlorine dioxide reacts significantly less with organic ingredients, and no reactions that form odor substances and flavor substances are known. Furthermore, chlorine dioxide also reduces biofilms. Nevertheless, there is no oxidative damage to the ion exchanger resin.

It is advantageous if a chlorite component, particularly an earth alkali chlorite or alkali chlorite, is metered into the regeneration agent solution. The chlorite component is the educt for the subsequent electrolysis reaction that produces chlorine dioxide. It is particularly advantageous if the regeneration agent solution, formed by a saline solution, has sodium chlorite solution applied to it. Particularly preferably, a sodium chlorite solution is metered into a saline brine as the regeneration agent in such a manner that a sodium chlorite concentration in the saline brine of 1 to 5 g/l results.

Another advantageous embodiment provides that the regeneration agent solution is mixed with a chlorite component, particularly sodium chlorite, in a reservoir that can be connected with the ion exchanger, preferably at regular time intervals. As a result of the chlorine dioxide formation brought about solely with this two-component system, germ build-up in the reservoir can also be prevented.

According to another advantageous measure, the chlorite component is introduced into the regeneration agent solution as an aqueous solution, preferably by way of a T-piece of a regeneration agent line, whereby the regeneration agent solution that contains chlorite is electrolyzed before being passed through the ion exchanger, bringing about the production of chlorine dioxide.

In this connection, it is advantageous if the regeneration agent solution containing chlorite is electrolyzed in a flow-through cell between two electrodes, under direct voltage, and the direct voltage has its poles reversed at pre-determined intervals, preferably in consecutive regeneration phases. In this manner, disadvantageous surface effects at the electrodes can be avoided.

A system that is suitable for carrying out the method according to the invention, which has a reservoir that can be connected with the ion exchanger by way of a line, in order to feed it with regeneration agent, is characterized in that the reservoir or the line can have chlorite component applied to it from a supply. In this way, separate disinfection steps and complicated apparative devices are eliminated. Preferably, the chlorite component is formed by an earth alkali chlorite or alkali chlorite.

Another improvement is achieved in that the chlorite component can be metered into the line or the reservoir by way of a pump, in aqueous solution, preferably as a sodium chlorite solution. In this connection, the chlorine dioxide production in the reservoir takes place without additional oxidation agents or acids, so that no particular hazard potential exists.

For targeted chlorine dioxide production during regeneration agent application to the exchanger, it is advantageous if a flow-through electrolysis cell for the regeneration agent solution containing chlorite is disposed in the line. In this connection, it is particularly advantageous if the flow-through electrolysis cell has two electrode pins around which flow takes place, preferably platinum-plated titanium pins.

For advantageous control of the operational process, a shut-off valve for a shut-off with regard to the ion exchanger is disposed in the line.

In the following, the invention will be explained in greater detail using an exemplary embodiment shown in the drawing. The single FIGURE shows a schematically simplified system schematic of an ion exchanger system with chlorine dioxide disinfection.

The ion exchanger system shown consists essentially of an ion exchanger 10, a reservoir 12 for regeneration agent 14, a supply 16 for sodium chlorite solution 18, and an electrolysis cell 20 in a connection line 22 between reservoir 12 or supply 16, respectively, and ion exchanger 10.

In standard operation, the ion exchanger 10 is connected with an untreated water inlet 28 at its input 24, by way of an inlet valve 26, and with a soft water outlet 34 at its output 30, by way of an outlet valve 32.

For regeneration operation, the input 24 can be connected with the connection line 22 by way of the valve 36, and the output 30 can be connected with a waste water outlet 40 by way of the valve 38, while the valves 26, 32 are closed in this phase.

Metering-in of the solutions 14, 18 takes place by means of pumps 42, 44, the outputs of which empty into the connection line 22, together, by way of a T-piece 46.

The electrolysis cell 20 can be connected with a direct-voltage source whose poles can be reversed, with its voltage connectors 48, 50. The electrodes 50 are formed from cylindrical, platinum-plated titanium pins, which project into a flow-through region at a distance from and parallel to one another.

In standard operation, the valves 26, 32 are open and the valves 36, 38 are closed. The untreated water flows through the ion exchanger container 10 from top to bottom, under pressure. In this connection, calcium and magnesium cations that are contained in the water are exchanged for sodium cations, at the surface of the cation exchanger, in order to be able to tap soft water at the outlet 34 and minimize lime precipitation in the subsequent pipeline installation and the fittings.

When the exchange capacity of the ion exchanger 10 has been exhausted, a control triggers regeneration, in that the valves 26, 32 are closed and the valves 36, 38 are opened. The pump 42 transports the regeneration agent 14 formed by saturated saline brine (NaCl solution) into the line 22, while the pump 44 mixes in a 30% sodium chlorite solution 18 (NaCl$_2$ solution), for disinfection purposes, by way of the T-piece 46, so that a sodium chlorite concentration in the saline brine of 1 to 5 g/l results. Subsequently, this mixed solution is electrolyzed by means of the electrolysis cell 20, as it flows through. In this connection, the following oxidation reactions with the following standard oxidation potentials at the anode are possible:

$$Cl^- + H_2O \rightarrow HClO + H^+ + 2e^- \quad -1.49\,V$$

$$ClO_2^- \rightarrow ClO_2(aq) + e^- \quad -0.954\,V$$

The reaction at the cathode is the reduction of the protons:

$$H^+ + e^- \rightarrow \tfrac{1}{2}H_2$$

Since the standard oxidation potential of the chlorite anion is lower than that of the chloride anion, the chlorite anion is oxidized first and what is formed is almost exclusively chlorine dioxide, which completely dissolves in the saline brine. The formation of the hydrogen is evident from the gas formation. Because of the way the process is conducted, however, the turn-over of electrodes is slight, so that the gas formation is not disruptive.

The saline brine that contains chlorine dioxide accordingly can be produced according to the following example:

An 8% saline brine that contains 1 g/l sodium chlorite is passed through a flow-through electrolysis cell. Under the following general conditions, at least 2 mg/l chlorine dioxide are produced:

Volume stream of the saline brine containing sodium chlorite through the electrolysis cell: 6 l/min Electrodes: two cylindrical platinum-plated titanium pins having a length of 20 mm at a distance of 5 mm Dwell time of the solution at the electrodes approximately 0.03 s Electrolysis voltage: 18 V direct voltage Current flow 5 A.

The chlorine dioxide that is formed is passed over the ion exchanger material as a germicidal agent, in the mixed solution. To dispose of it, the regeneration solution is passed away by way of the waste water outlet 40. In order to avoid deposits on the electrodes 50, the poles of the voltage source can be reversed in consecutive regeneration intervals.

At the end of each regeneration phase, flushing of the exchanger 10 and replacement water feed into the reservoir 12 take place. For this purpose, not only the valves 36, 38 but also the inlet valve 26 are opened. The untreated water displaces the regeneration solution and washes the ion exchanger 10. At the same time, water is passed into the reservoir 12 again, by way of the bypass 52, in order to replace the volume used during regeneration. The saline brine is automatically formed from saline tablets that are situated in the reservoir 12.

In order to prevent germ formation in the regeneration agent 14, as well, sodium chlorite solution can be metered into the reservoir 14 by means of the metering pump 44. In this way, chlorine dioxide is formed as a disinfecting agent in the reservoir 12 even without electrolytic acceleration of the reaction.

By means of metering in a reduction agent (e.g. sodium sulfite) into the regeneration waste water, it is possible to prevent chlorite or chlorine dioxide from being carried out. For this purpose, it is also possible to draw the regeneration waste water off by way of a solid bed 54 of calcium sulfite. Alternatively to this, sodium sulfite can be metered into the displacement water, so that excess chlorite or chlorine dioxide is already reduced to chloride in the ion exchanger material after the completion of disinfection.

As explained below, it was possible to demonstrate the desired disinfection effect in a comparison experiment.

In a two-column household water softener system having an acidic cation exchanger of 4.7 l, in each instance, both columns were contaminated with 100 ml 10E7/ml CFU *E. coli*. Twenty-four hours later, the first column was regenerated with electrolytically produced chlorine as a disinfecting agent. The current flow in the electrolysis cell amounted to 0.6 to 0.7 A, whereby 0.5 to 0.6 mg/l free chlorine were determined in the regeneration waste water.

The second column was regenerated with electrolytically produced chlorine dioxide as the disinfecting agent. The current flow in the electrolysis cell amounted to 0.6 to 0.7 A, whereby 0.5 to 0.6 mg/l free chlorine were determined in the regeneration waste water.

The germ contamination with *E. coli* was determined as CFU/ml and CFU/100 ml in the run-off of the water, at the time intervals indicated below, immediately after regeneration. The water flow through the system was 120 l/h. In the following table, "contaminated" means more than 2000 CFU/100. The results document the superiority of chlorine dioxide as a disinfection agent as compared to chlorine as conventionally used.

| Time min | Chlorine CFU/ml | Chlorine CFU/100 ml | Chlorine dioxide CFU/ml | Chlorine dioxide CFU/100 ml |
|---|---|---|---|---|
| 0.5 | 10 | contaminated | 0 | 0 |
| 1 | 10 | contaminated | 0 | 7 |
| 2 | 5 | contaminated | 0 | 4 |
| 10 | 1 | 92 | 0 | 0 |

In summary, the following should be stated: The invention relates to a method and a system suitable for the purpose, for hygienic operation of an ion exchanger 10 in water treatment, whereby the ion exchanger 10 is regenerated by means of a regeneration agent solution 14 during a regeneration phase. In order to achieve a disinfecting effect at the same time, chlorine dioxide is generated in situ in the regeneration agent solution 14, and passed through the ion exchanger 10.

The invention claimed is:

1. A method for hygienic operation of an ion exchanger, particularly in water treatment, in which the ion exchanger is regenerated by means of a regeneration agent solution during a regeneration phase, wherein the regeneration agent solution formed by a saline solution has sodium chlorite applied to it, and wherein chlorine dioxide is generated in situ in the regeneration agent solution, and passed through the ion exchanger.

2. A method for hygienic operation of an ion exchanger, particularly in water treatment, in which the ion exchanger is regenerated by means of a regeneration agent solution during a regeneration phase, wherein a sodium chlorite solution is metered into a saline brine in such a manner that a sodium chlorite concentration in the saline brine of 1 to 5 g/l results, and wherein chlorine dioxide is generated in situ in the regeneration agent solution, and passed through the ion exchanger.

3. A method for hygienic operation of an ion exchanger, particularly in water treatment, in which the ion exchanger is regenerated by means of a regeneration agent solution during a regeneration phase, wherein the regeneration agent solution is mixed with a chlorite component, particularly sodium chlorite, in a reservoir that can be connected with the ion exchanger, preferably at regular time intervals, and wherein chlorine dioxide is generated in situ in the regeneration agent solution, and passed through the ion exchanger.

4. A method for hygienic operation of an ion exchanger, particularly in water treatment, in which the ion exchanger is regenerated by means of a regeneration agent solution during a regeneration phase, wherein the chlorite component is introduced into the regeneration agent solution (14) as an aqueous solution, preferably by way of a T-piece of a regeneration agent line, and wherein chlorine dioxide is generated in situ in the regeneration agent solution, and passed through the ion exchanger.

5. A method for hygienic operation of an ion exchanger, particularly in water treatment, in which the ion exchanger is regenerated by means of a regeneration agent solution during a regeneration phase, wherein the regeneration agent solution containing chlorite is electrolyzed in a flow-through cell between two electrodes, under direct voltage, and the direct voltage has its poles reversed at pre-determined intervals, preferably in consecutive regeneration phases, and wherein chlorine dioxide is generated in situ in the regeneration agent solution, and passed through the ion exchanger.

6. A method for hygienic operation of an ion exchanger, particularly in water treatment, in which the ion exchanger is regenerated by means of a regeneration agent solution during a regeneration phase, wherein chlorine dioxide is generated in situ in the regeneration agent solution, and passed through the ion exchanger, and wherein a reduction agent, particularly sodium sulfite, is metered into the regeneration agent solution passed out of the ion exchanger.

7. A method for hygienic operation of an ion exchanger, particularly in water treatment, in which the ion exchanger is regenerated by means of a regeneration agent solution during a regeneration phase, wherein chlorine dioxide is generated in situ in the regeneration agent solution, and passed through the ion exchanger, and wherein the regeneration agent solution is passed away by way of a solid bed, preferably formed by calcium sulfite, that follows the ion exchanger.

8. A method for hygienic operation of an ion exchanger, particularly in water treatment, in which the ion exchanger is regenerated by means of a regeneration agent solution during a regeneration phase, wherein chlorine dioxide is generated in situ in the regeneration agent solution, and passed through the ion exchanger, and wherein at the end of the regeneration phase, water for displacement of regeneration agent is passed through the ion exchanger, and a reduction agent, particularly sodium sulfite, is metered into the displacement water.

* * * * *